United States Patent
Couwenhoven et al.

(10) Patent No.: US 7,234,791 B2
(45) Date of Patent: Jun. 26, 2007

(54) REDUCING INK BLEED ARTIFACTS

(75) Inventors: Douglas W. Couwenhoven, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 138 days.

(21) Appl. No.: 11/114,530

(22) Filed: Apr. 26, 2005

(65) Prior Publication Data
US 2006/0238555 A1    Oct. 26, 2006

(51) Int. Cl.
*B41J 2/205* (2006.01)
*H04N 1/46* (2006.01)

(52) U.S. Cl. .................... 347/15; 358/1.9; 358/512

(58) Field of Classification Search .................. 347/15, 347/43; 358/3.1, 3.06, 3.26, 512, 1.9
See application file for complete search history.

(56) References Cited

U.S. PATENT DOCUMENTS

| | | |
|---|---|---|
| 5,168,552 A | 12/1992 | Vaughn et al. |
| 5,428,377 A | 6/1995 | Stoffel et al. |
| 5,568,169 A | 10/1996 | Dudek et al. |
| 5,570,118 A | 10/1996 | Rezanka et al. |
| 5,596,355 A | 1/1997 | Koyama et al. |
| 5,635,967 A * | 6/1997 | Klassen ........................ 347/43 |
| 5,699,492 A | 12/1997 | Karaki |
| 5,751,310 A | 5/1998 | Yano et al. |
| 5,809,215 A | 9/1998 | Heydinger et al. |
| 5,946,454 A * | 8/1999 | Shu et al. ..................... 358/1.9 |
| 5,975,678 A | 11/1999 | Kanematsu et al. |
| 5,992,962 A * | 11/1999 | Yen et al. ....................... 347/9 |
| 5,992,971 A | 11/1999 | Takahashi et al. |
| 6,007,182 A | 12/1999 | Matsubara et al. |
| 6,015,206 A | 1/2000 | Heydinger et al. |
| 6,084,604 A | 7/2000 | Moriyama et al. |
| 6,118,548 A | 9/2000 | Ryan |
| 6,164,756 A | 12/2000 | Takahashi et al. |
| 6,259,536 B1 | 7/2001 | Coleman |
| 6,270,186 B1 | 8/2001 | Smith et al. |
| 6,312,102 B1 | 11/2001 | Moriyama et al. |
| 6,361,144 B1 | 3/2002 | Torpey et al. |
| 6,412,938 B1 | 7/2002 | Markham et al. |
| 2004/0114158 A1 | 6/2004 | Klassen et al. |

\* cited by examiner

*Primary Examiner*—Lamson Nguyen
(74) *Attorney, Agent, or Firm*—Raymond L. Owens (57) ABSTRACT

A method for forming a modified digital image by modifying an input digital image having a black input color channel corresponding to a black colorant and one or more additional input color channels corresponding to additional colorants, each color channel having an (x,y) array of image pixel values, to form a modified digital image having one or more modified color channels, said modified digital image being suitable for producing a printed image having reduced ink bleed artifacts on an inkjet printer using the black and additional colorants includes forming a filtered black color channel from the black input color channel using a convolution operation, and forming the modified digital image by modifying image pixel values in one or more of the additional input color channels in response to the corresponding image pixel values of the filtered black color channel.

24 Claims, 11 Drawing Sheets

REDUCING INK BLEED ARTIFACTS

FIELD OF THE INVENTION

This invention pertains to the field of ink jet printing systems, and more particularly to a method for reducing ink bleed artifacts.

BACKGROUND OF THE INVENTION

Ink jet printers have become a very common way for printing images from a computer. Ink jet printers work by spraying small drops of colorants (ink) onto a receiver to form an image. Typically, ink jet printers use four or more different colors of colorants to produce colored images. Most commonly cyan (C), magenta (M), yellow (Y), and black (K) colorants are used. Sometimes additional colorants such as red, green, blue, orange, light cyan, or light magenta are also used. A given set of colorants, together with the writing system used to spray the ink on the receiver, will have an associated color gamut, which is defined to be the set of colors that can be made using the printer. The different colors within the color gamut can be made by adjusting the amounts of the various colorants that are applied in a given region of the print.

One problem that has been common in ink jet printers is an artifact commonly referred to as "ink bleed." Ink bleed occurs when ink that is sprayed on the receiver in one location spreads laterally on the page to a region where it is not wanted. Ink bleed can result if too much ink is applied to the page in a given location such that the receiver cannot absorb the ink and it forms a puddle on the surface, which can then seep laterally.

Figure 1A:
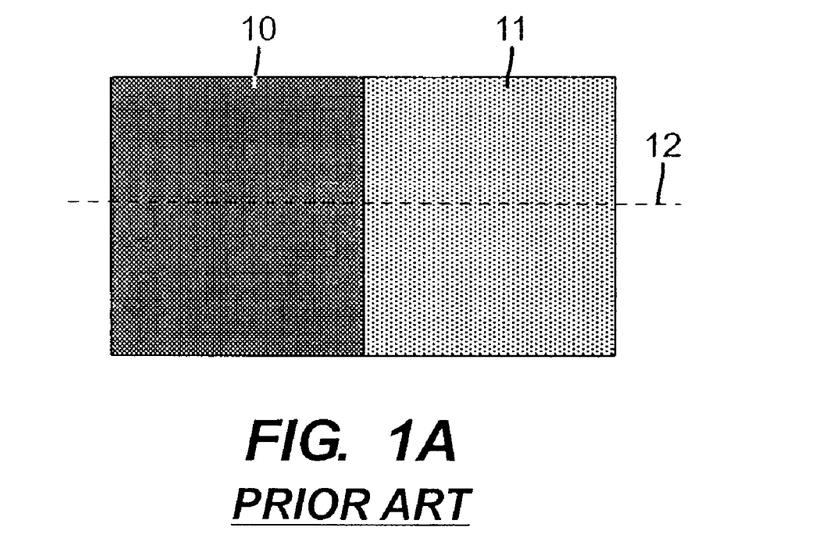
FIG. 1A illustrates a boundary between black and colored ink patches.
Figure 1B:
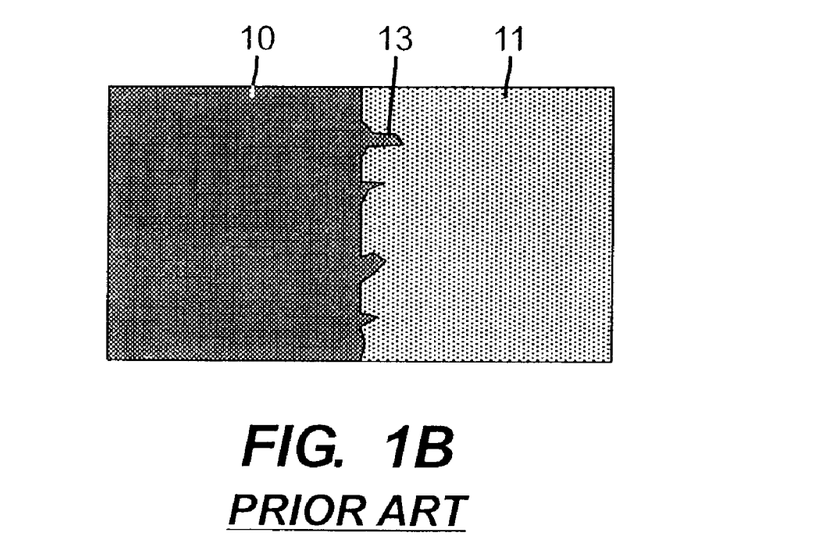
FIG. 1B illustrates the appearance of ink bleed artifacts.

Another source of bleed is due to differences in the chemical formulations of the inks. Typically, the chemical formulations of black inks are quite different than the chemical formulations of the colored inks. These differences can make the image particularly susceptible to bleed at interfaces between regions where black ink is applied, and regions where colored ink is applied. An example of this would be printing black text on a yellow background, or printing a pie chart having colored segments with a black border. An illustration of such an interface is shown in FIG. 1A. Here a first region 10 comprised of a large amount of black ink is adjacent to a second region 11 comprised of a large amount of colored ink, such as cyan, magenta, or yellow. FIG. 1B illustrates the appearance of ink bleed artifacts 13 that can occur at the interface between the first region 10 and the second region 11. In this example, the black ink from the first region 10 can be seen to have seeped into the colored ink in the second region 11. However, bleed can also happen in the reverse direction as well. Often the bleed artifacts 13 take the form of small "fingers" of ink that grow out from one region to the other.

There have been a number of approaches disclosed in the prior art to address this problem. In U.S. Pat. No. 5,168,552, Vaughn et al. disclose a method where composite black is changed to true black ink except when black dots are within a minimum spacing from color dots.

In U.S. Pat. No. 5,428,377, Stoffel et al. disclose a method for adjusting what ink(s) are used to print black image areas depending on whether the surrounding pixels contain black, colored, or blank content.

In U.S. Pat. No. 5,568,169, Dudek et al. disclose a method for adjusting usage of slow- and fast-drying black inks depending on whether the surrounding pixels contain any colored inks. The slow-drying ink is either totally replaced, or is selectively replaced.

In U.S. Pat. No. 5,570,118, Rezanka et al. disclose a method for reducing ink bleed by producing a small gap between a slow-drying black ink region and a fast-drying color inks region. In one embodiment, the gap is filled in with a fast-drying second black ink.

In U.S. Pat. No. 5,596,355, Koyama et al. disclose a dot judgment circuit for determining whether to print black pixels using a slow-drying black ink or fast-drying colored inks depending on whether color image content is surrounding the black pixels.

In. U.S. Pat. No. 5,635,967, Klassen discloses a method for reducing ink bleed for a binary image that involves blurring the binary image to form a continuous tone image, detecting edges in the continuous tone image, and reducing the number of pixels printed on the edge in the original binary image.

In U.S. Pat. No. 5,699,492, Karaki discloses a method for changing from pure black pixels to composite black pixels for black areas that are in contact with color areas.

In U.S. Pat. No. 5,751,310, Yano et al. disclose a method for replacing black ink with a process black in a border region where black and colored regions are adjacent. The border region is detected using an expansion operation.

In U.S. Pat. No. 5,809,215, Heydinger et al. disclose a method for reducing ink bleed whereby black pixels are altered when a certain fraction of nearby pixels contain colored ink. Methods for altering the black pixels include removing selected pixels or removing all of the pixels.

In U.S. Pat. No. 5,975,678, Kanematsu et al. disclose a method for selectively replacing black ink with colored inks depending on the proximity to colored regions. The degree of proximity is determined by doing a weighted sum according to an array of distance-weighted coefficients. Depending on the degree of proximity, more or less ink is substituted.

In U.S. Pat. No. 5,992,971, Takahashi et al. disclose a method whereby ratio of black and colored is adjusted according to the color content of nearby marginal pixels. In some embodiments, the amount of adjustment is dependent on distance between the current pixel and the marginal pixel.

In U.S. Pat. No. 6,007,182, Matsubara et al. disclose a method for adjusting what ink(s) are used to print black image areas depending on whether any surrounding pixels contain colored image data. In areas adjacent to colored regions, black is made using CMY inks. Otherwise, black ink is used.

In U.S. Pat. No. 6,015,206, Heydinger et al. disclose a method where ink bleed is reduced by printing process black and black ink in an alternating pattern for dots on the boundary between black regions and color regions.

In U.S. Pat. Nos. 6,084,604 and 6,312,102, Moryiama et al. disclose a method for adjusting what ink(s) are used to print black image areas depending on whether any surrounding pixels contain colored image data. In areas adjacent to colored regions, black is made using CMY inks, and using black ink elsewhere.

In U.S. Pat. No. 6,118,548, Ryan discloses a method for replacing black ink with a process black for regions near colored pixels. A logical search sequence is used to identify the nearest colored pixel.

In U.S. Pat. No. 6,164,756, Takahashi et al. disclose a method for reducing bleed by using a multipass mode for image regions where a boundary between a black image region and a colored image region is detected, and a faster single pass mode otherwise.

In U.S. Pat. No. 6,259,536, Coleman discloses a method for determining whether to use black ink or process black to print a black object depending on whether the black object is on a colored background.

In U.S. Pat. No. 6,270,186, Smith et al. disclose a method for reducing ink bleed in a multilevel ink jet printer capable of printing multiple numbers of drops at a given pixel location by reducing the number of pixels printed with more than one drop in a black/colored border region.

In U.S. Pat. No. 6,361,144, Torpey et al. disclose a method for reducing intercolor bleed using a color pixel modification pattern to remove a fraction of the color pixels near a color/black boundary, and using a black pixel modification pattern to replace black ink pixels near a boundary with colored inks.

In U.S. Pat. No. 6,412,938, Markham et al. disclose a method whereby bleed is reduced by printing black ink in a multipass mode using a larger print head, and colored inks are printed in a single-pass mode.

In U.S. Patent Application Publication 2004/0114158 A1, Klassen, et al. disclose a way for intercolor bleed reduction in liquid ink printers which uses an edge detection operation to find edges in the image and determines a reduction factor for edge pixels based on the ink coverage level.

SUMMARY OF THE INVENTION

It is an object of the present invention to reduce bleed artifacts in ink jet printers. It is a further object of the present invention to do this in a computationally efficient manner that can be readily adjusted to account for differences in ink, media and printer characteristics.

These objects are achieved by a method for forming a modified digital image by modifying an input digital image having a black input color channel corresponding to a black colorant and one or more additional input color channels corresponding to additional colorants, each color channel having an (x,y) array of image pixel values, to form a modified digital image having one or more modified color channels, said modified digital image being suitable for producing a printed image having reduced ink bleed artifacts on an ink jet printer using the black and additional colorants, comprising:

a) forming a filtered black color channel from the black input color channel using a convolution operation; and b) forming the modified digital image by modifying image pixel values in one or more of the additional input color channels in response to the corresponding image pixel values of the filtered black color channel, so that when the modified digital image is used to produce a printed image on an ink jet printer there are reduced ink bleed artifacts.

Advantages

This invention has the advantage that it reduces objectionable bleed artifacts associated with ink jet printers in a computationally simple and efficient manner. It has the additional advantage that the method uses a tunable configuration that can be optimized for different ink/media characteristics. Another advantage is that the magnitude of correction is adaptively adjusted according to the amount of ink used at the boundary between a black and colored region in order to avoid the appearance of halo artifacts.

DETAILED DESCRIPTION OF THE INVENTION

The present invention will now be described with reference to the flow diagram given in FIG. 5. An input digital image 50 is comprised of a black color channel 51 corresponding to a black colorant, and one or more additional color channels 52 corresponding to additional colorants. In ink jet printers, such colorants are referred to as inks. The black color channel 51 is processed using a convolution operation 53 to form a filtered black color channel 54. A form modified additional color channels step 55 is then used to modify one or more of the additional color channels 52 in response to the filtered black color channel 54 to form a set of modified additional color channels 56. The original black color channel 51, together with the modified additional color channels 56 comprise a modified digital image 57, the modified digital image 57 being suitable for producing a printed image having reduced ink bleed artifacts on an ink jet printer.

Figure 2A:
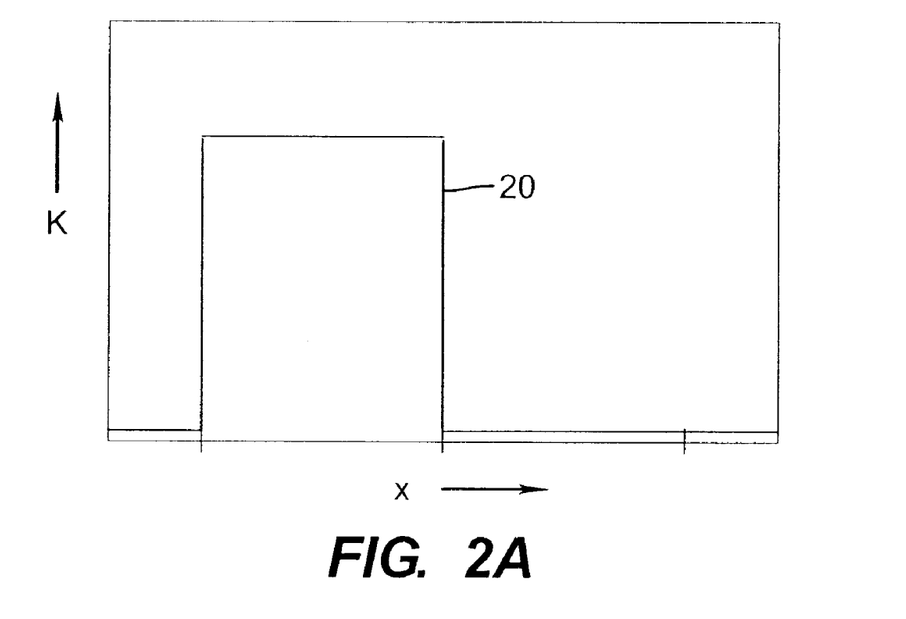
FIG. 2A shows a black input image cross-section.
Figure 2B:
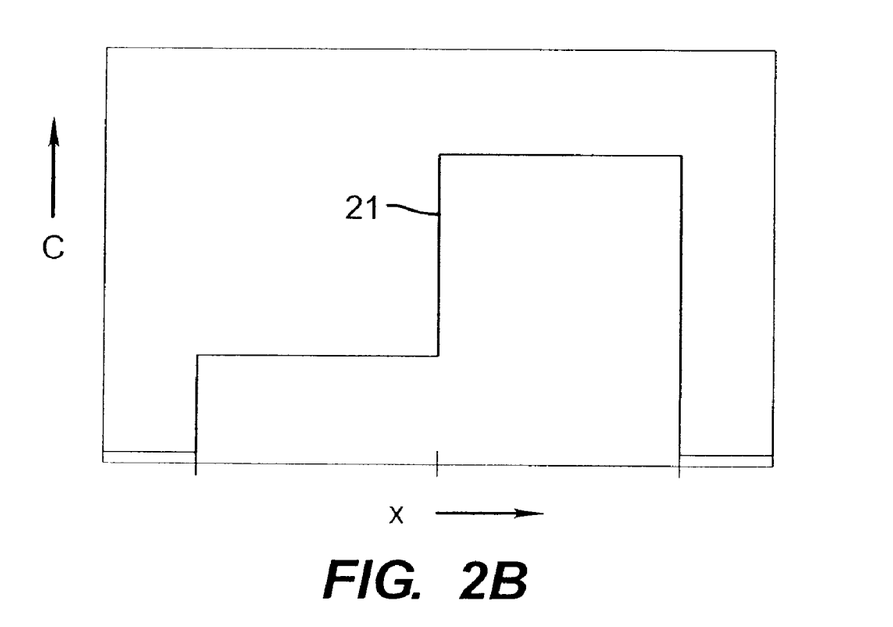
FIG. 2B shows a colored input image cross-section.

The method of the present invention can be illustrated by considering the example image shown in FIG. 1A. Cross-sections through the image regions at the cross-section line 12 are shown in FIG. 2A and FIG. 2B. In this example, the first region 10 is a black patch comprised of a high-level of black ink, together with a lesser amount of cyan ink, and the second region 11 is a cyan patch comprised of a high-level of cyan ink, with no other inks. FIG. 2A illustrates the black input image cross-section 20, giving the image pixel values K for the black input color channel of the input digital image as a function of the position coordinate x. It can be seen that for the range of x values corresponding to the first region 10 the K values are large, and for the range of x values corresponding to the second region 11, the K values are zero. FIG. 2B illustrates the cyan input image cross-section 21, giving the image pixel values C for the cyan input color channel of the input digital image as a function of the position coordinate x. It can be seen that for the range of x values corresponding to the second region 11 the C values are large, and for the range of x values corresponding to the first region 10, the C values are smaller, but non-zero.

Figure 3A:
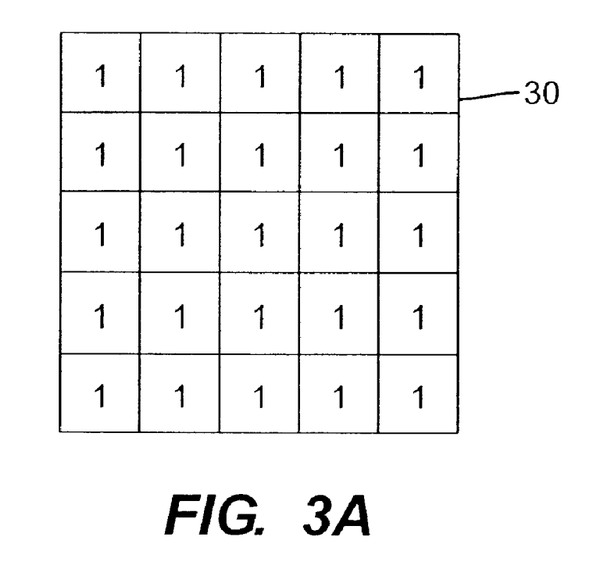
FIG. 3A shows a typical low-pass convolution filter.
Figure 3B:
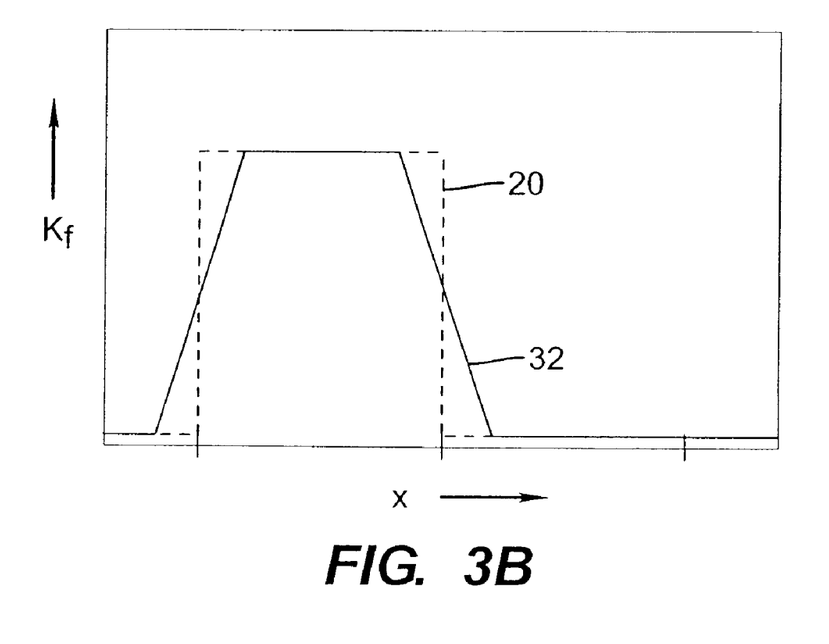
FIG. 3B shows a low-pass filtered black image cross-section.

A typical low-pass convolution filter 30 is shown in FIG. 3A. In this example, the filter is a 5×5 "box filter." (A "box filter" is a simple filter where all of the filter coefficients are the same.) Convolution operations are well known in the art, and in accordance with the present invention include calculations where a neighborhood of pixels around a center pixel are weighted by a matrix of filter coefficients to determine a filtered pixel value, or mathematical equivalents thereof. FIG. 3B illustrates a low-pass filtered black image cross-section 32 which results from using the convolution operation 53 to process the black color channel 51 with the low-pass convolution filter 30 of FIG. 3A, forming a filtered black color channel 54. As will be understood by one skilled in the art, the convolution operation 53 normalizes the convolution filter 30 so that the coefficients sum to unity, ensuring that the range of the filtered black color channel 54 matches the range of the black color channel 51. The plot shows the filtered black image pixel values $K_f$ as a function of position coordinate x. The original black input image cross-section 20 is shown for comparison. It can be seen that the effect of applying the low-pass convolution filter 30 is basically to blur out the edges of the image in the black color channel.

Figure 3C:
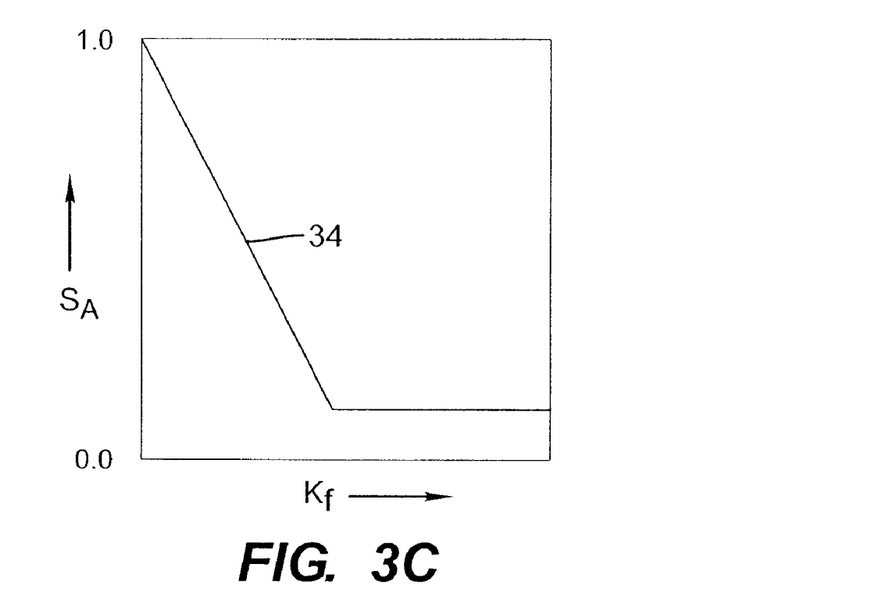
FIG. 3C shows a typical edge tapering function.
Figure 3D:
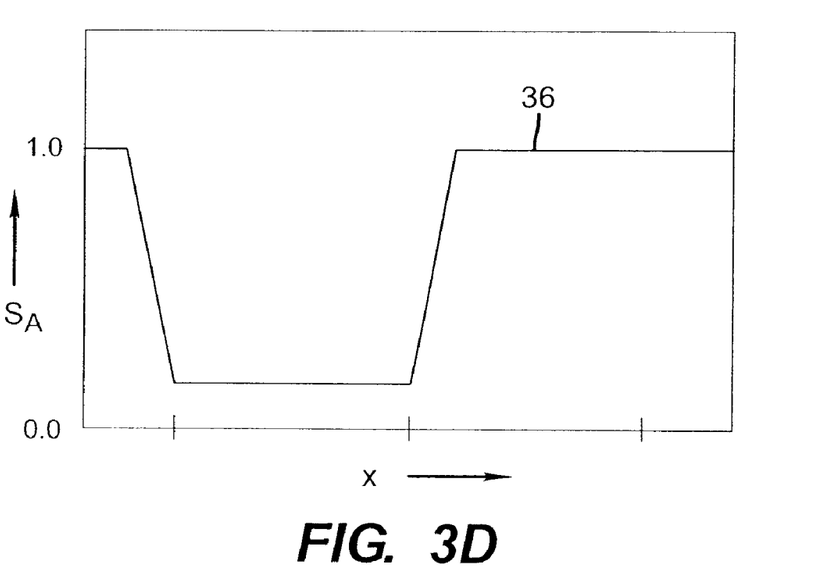
FIG. 3D shows a scale factor cross-section.

Next the form modified additional color channels step 55 is used to modify the additional color channels 52 in response to the filtered black color channel 54 to form a set of modified additional color channels 56. In this example, the form modified additional color channels step 55 involves the following operations. First, the filtered black color channel 54 is used to compute a pixel-dependent scale factor for the additional color channels $S_A$. One simple way for computing the pixel-dependent scale factor is to address an edge-tapering function 34 (such as shown in FIG. 3C) using the filtered black image pixel values $K_f$. This edge tapering function is designed to return a small scale factor when the filtered black image pixel value $K_f$ is large, and to return a unity scale factor when the filtered black image pixel value $K_f$ is zero. The result of applying the edge-tapering function 34 to the low-pass filtered black image cross-section 32 is illustrated in FIG. 3D, which shows a scale factor cross-section 36 representing the pixel-dependent scale factor for the additional color channels $S_A$ as a function of the position coordinate x. It can be seen that the scale factor is small where there was black ink in the input image, and unity in regions of the image where there was no black ink nearby. At the edges of the region where there was black ink, the scale factor can be seen to gradually increase from a small value up to unity.

Figure 3E:
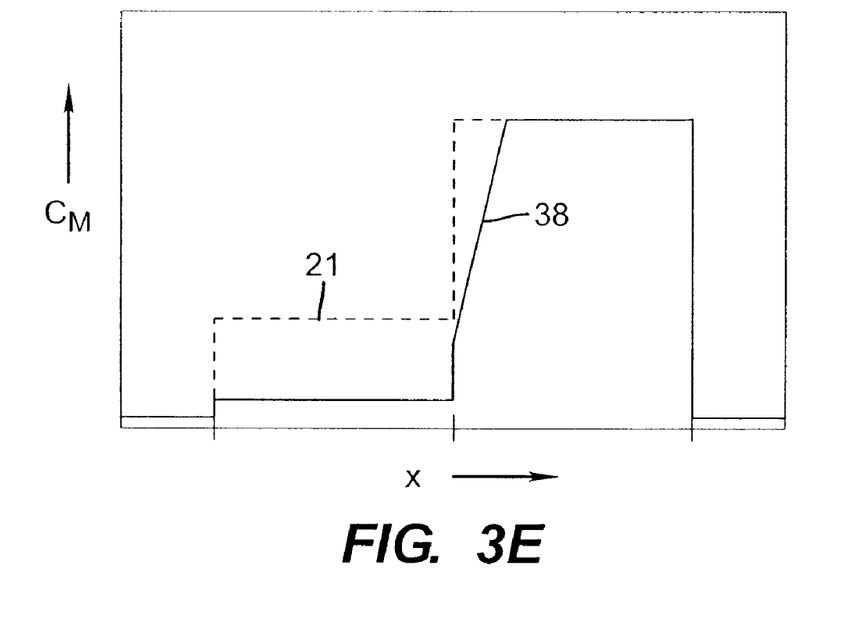
FIG. 3E shows a comparison between the colored input image cross-section and the modified cyan image cross-section.
Figure 3F:
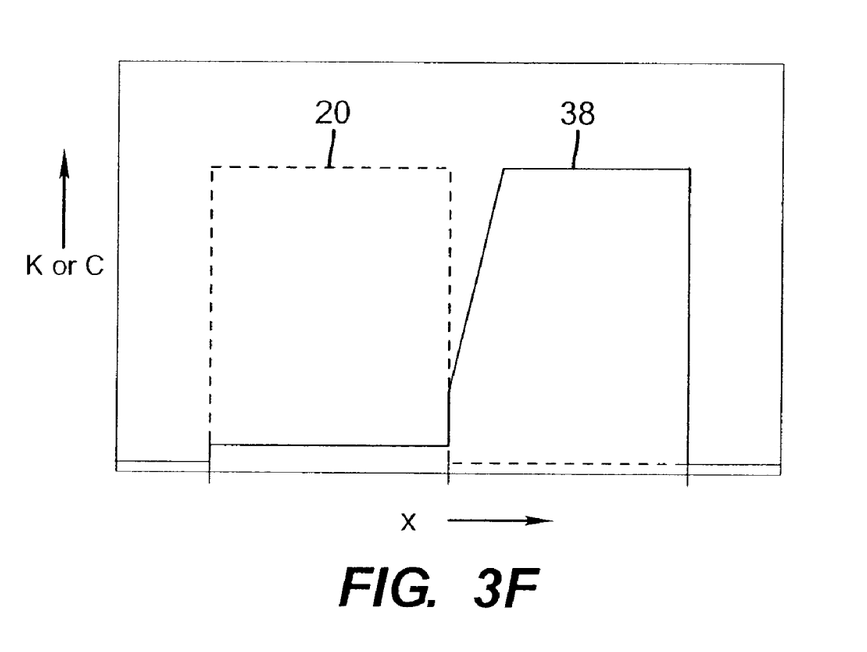
FIG. 3F shows cross-sections through the modified image.

Next, the additional color channels 52 are multiplied by the pixel-dependent scale factor to form modified additional color channels 56. A modified cyan image cross-section 38 is illustrated in FIG. 3E. The original cyan input image cross-section 21 is shown for comparison. It can be seen that the effect of applying the pixel-dependent scale factor is to reduce the cyan ink amount in image regions at or near where black ink is present (i.e., when the filtered black image pixel value $K_f$ is large), but to leave it unchanged when there is no black ink nearby. FIG. 3F shows cross-sections through the resulting modified digital image 57, which is comprised of the original black color channel 51, together with the modified additional color channels 56. When this corresponds to the black input image cross-section 20, together with the modified cyan image cross-section 38. It can be seen that the cyan ink amount has been reduced near the boundary between black image region and the cyan image region, as well as within the black image region itself. This reduction in the cyan ink amount will result in a substantial reduction in the amount of image bleed at the border.

The form of the edge-tapering function 34 provides many degrees of freedom to control just how much ink is removed near the boundary, and the size of the low-pass convolution filter will control the width of the ink-reduction region. For ink/media combinations where there is a lot of bleed, better results can be obtained using a large low-pass convolution filter, and an aggressive edge tapering function that quickly lowers the amount of ink used in the additional color channels.

Figure 4A:
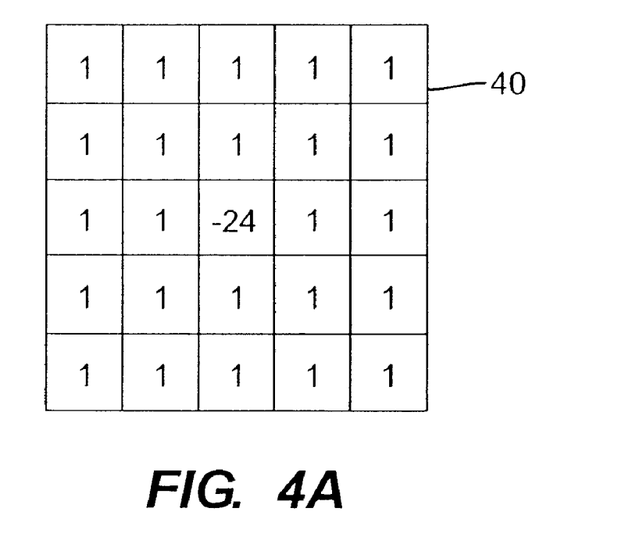
FIG. 4A shows a typical hi-pass convolution filter.
Figure 4B:
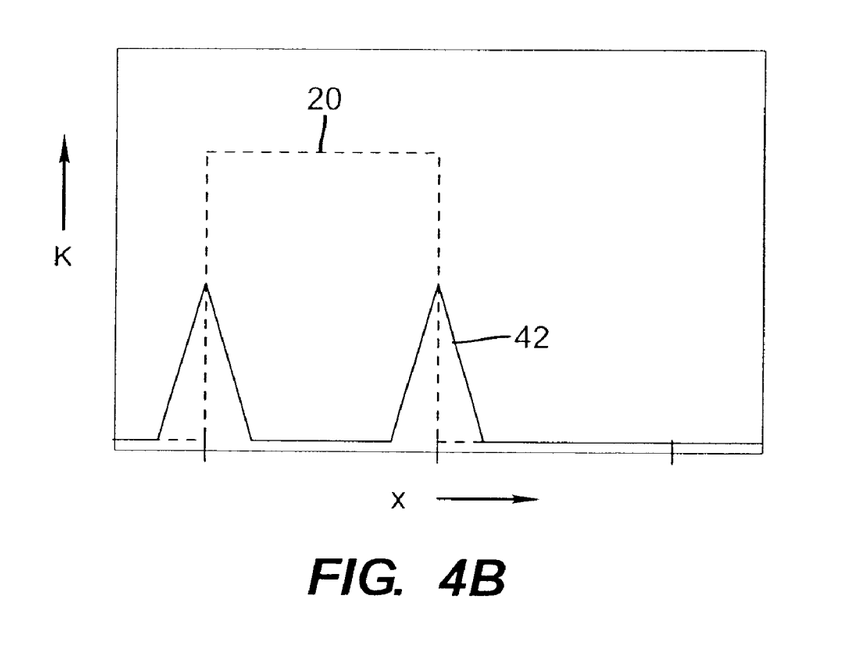
FIG. 4B shows a hi-pass filtered black image cross-section.

The embodiment that was described hereinabove represents just one possible implementation of the present invention. There are many possible variations of this invention that will be obvious to one skilled in the art. For example, it can be desirable to reduce the amount of ink in the additional color channels near the edge of the boundary region where bleed is likely to occur, but to leave it unchanged in image regions away from the boundary region. One way to accomplish this is to use a different type of convolution filter, such as a hi-pass convolution filter 40 as shown in FIG. 4A. A convolution operation that includes filtering the black color channel using the hi-pass convolution filter followed by applying an absolute value operation can be used to produce the hi-pass filtered black image cross-section 42 shown in FIG. 4B. An absolute value operation is a well known mathematical operator that returns the magnitude of its argument as a positive quantity. The original black input image cross-section 20 is shown again for comparison. It can be seen that the effect of applying the hi-pass convolution filter 40 is basically to identify image regions near edges in the black color channel.

Figure 4C:
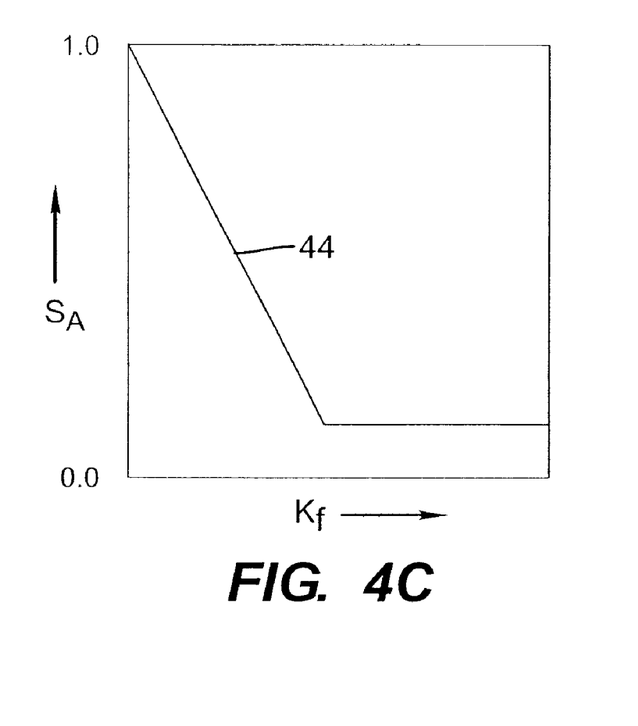
FIG. 4C shows a typical edge tapering function.
Figure 4D:
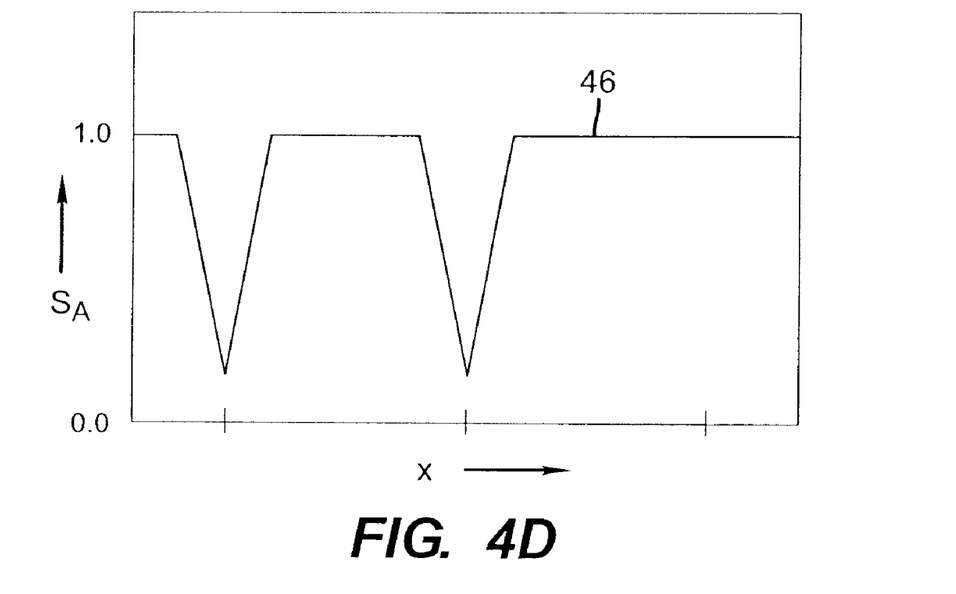
FIG. 4D shows a scale factor cross-section.
Figure 4E:
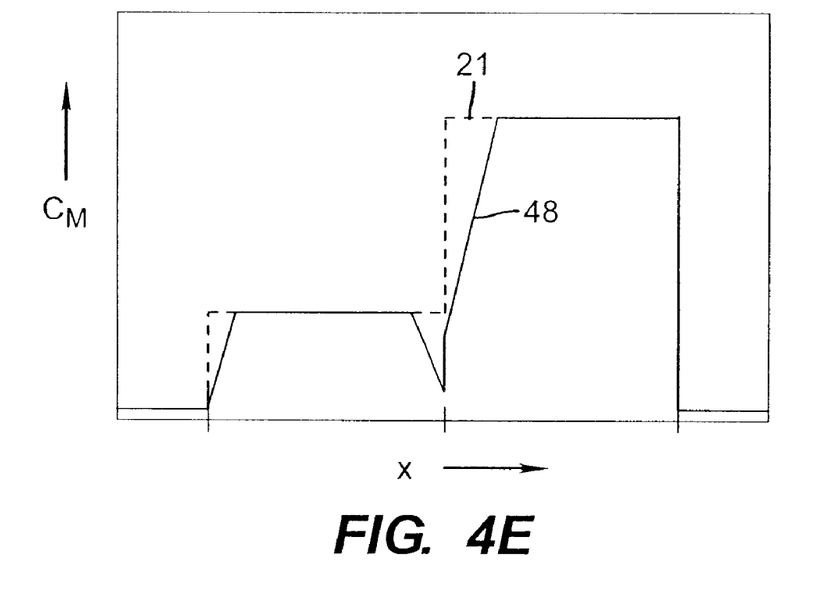
FIG. 4E shows a comparison between the colored input image cross-section and the modified cyan image cross-section.

Applying the edge-tapering function 44 in FIG. 4C to the filtered black image pixel values $K_f$ produces the scale factor cross-section 46 shown in FIG. 4D. It can be seen that the scale factor is small near any edges in the input black color channel, and unity otherwise. Multiplying the input cyan color channel by the pixel-dependent scale factor produces the modified cyan image cross-section 48 shown in FIG. 4E. The original cyan input image cross-section 21 is shown for comparison. It can be seen that the effect of applying the pixel-dependent scale factor is to reduce the cyan ink amount in image regions near edges in the black color channel, but to leave it unchanged otherwise.

Figure 4F:
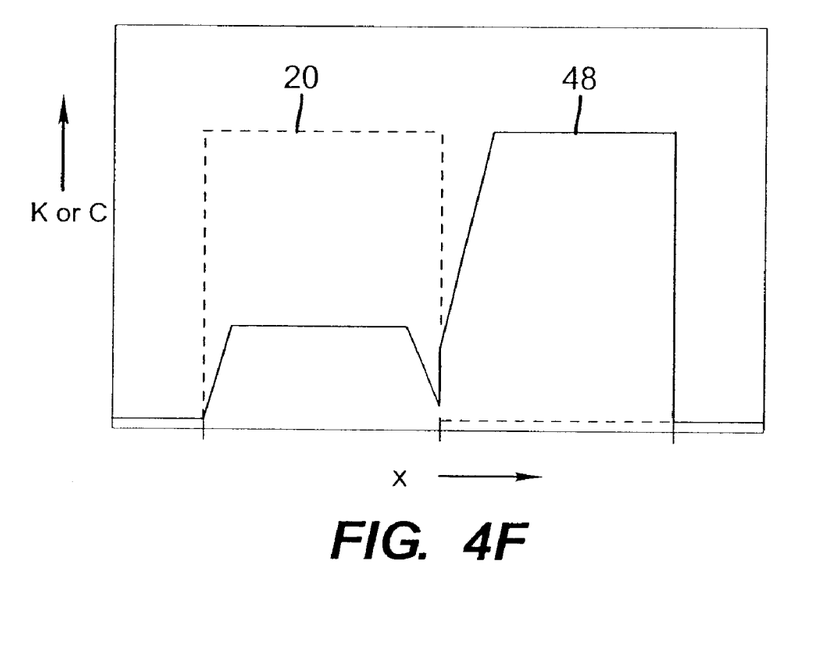
FIG. 4F shows cross-sections through the modified image.

FIG. 4F shows cross-sections through the resulting modified digital image 57, corresponding to the black input image cross-section 20, together with the modified cyan image cross-section 48. The reduced cyan ink amount near the boundary with the black image region will substantially reduce the presence of bleed artifacts, but since the amount of cyan ink is not significantly reduced within the black image region, this does not have the disadvantage of reducing the overall ink density in that region.

A third embodiment of the present invention will now be described. In this arrangement, it is desired to limit the total ink fluid amount, or ink colorant amount, of the modified additional color channels 56 to be less than or equal to a total colorant amount limit $V_L$ for pixels near a black edge. The total colorant amount limit $V_L$ is determined experimentally for a given ink and media combination, and set to a value that substantially prevents ink bleed artifacts from occurring. In many cases, it is not necessary to remove all of the colored ink next to a black edge to significantly reduce ink bleed artifacts, and as such the value of $V_L$ will generally be >0.

Figure 5:
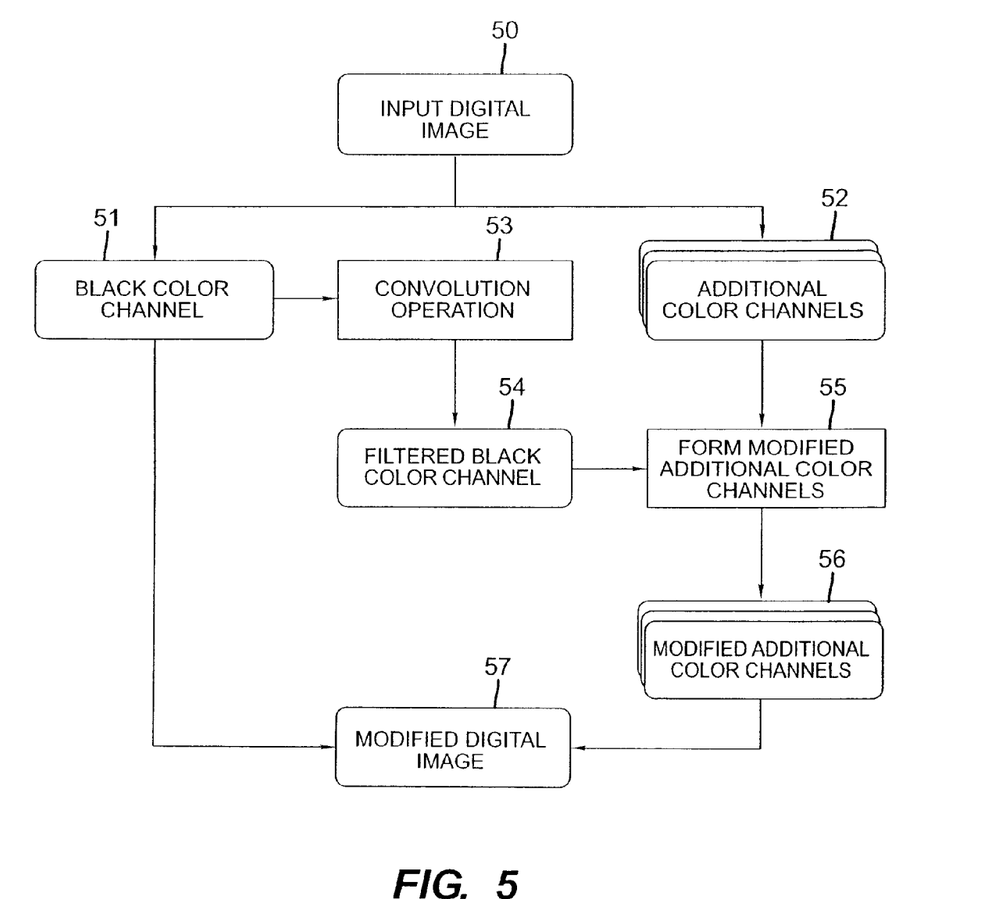
FIG. 5 is a flowchart illustrating the method of the present invention.
Figure 6:
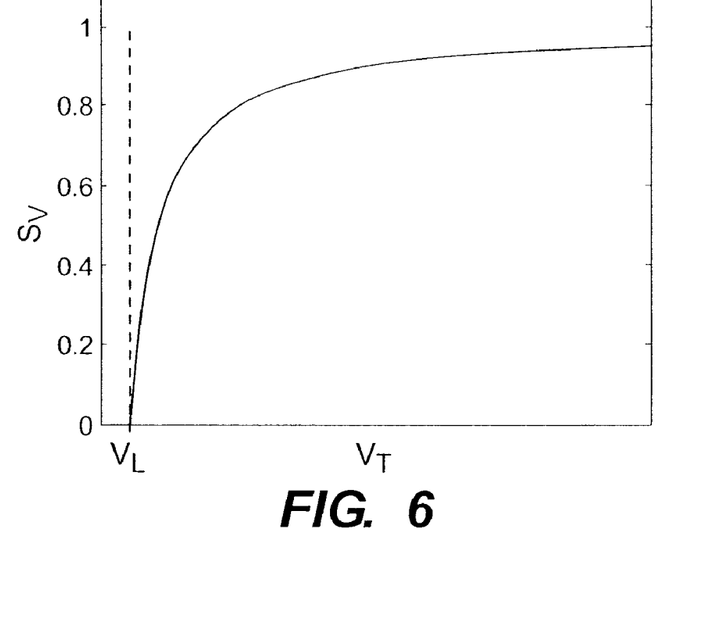
FIG. 6 is a plot of a typical volume tapering function.
Figure 8:
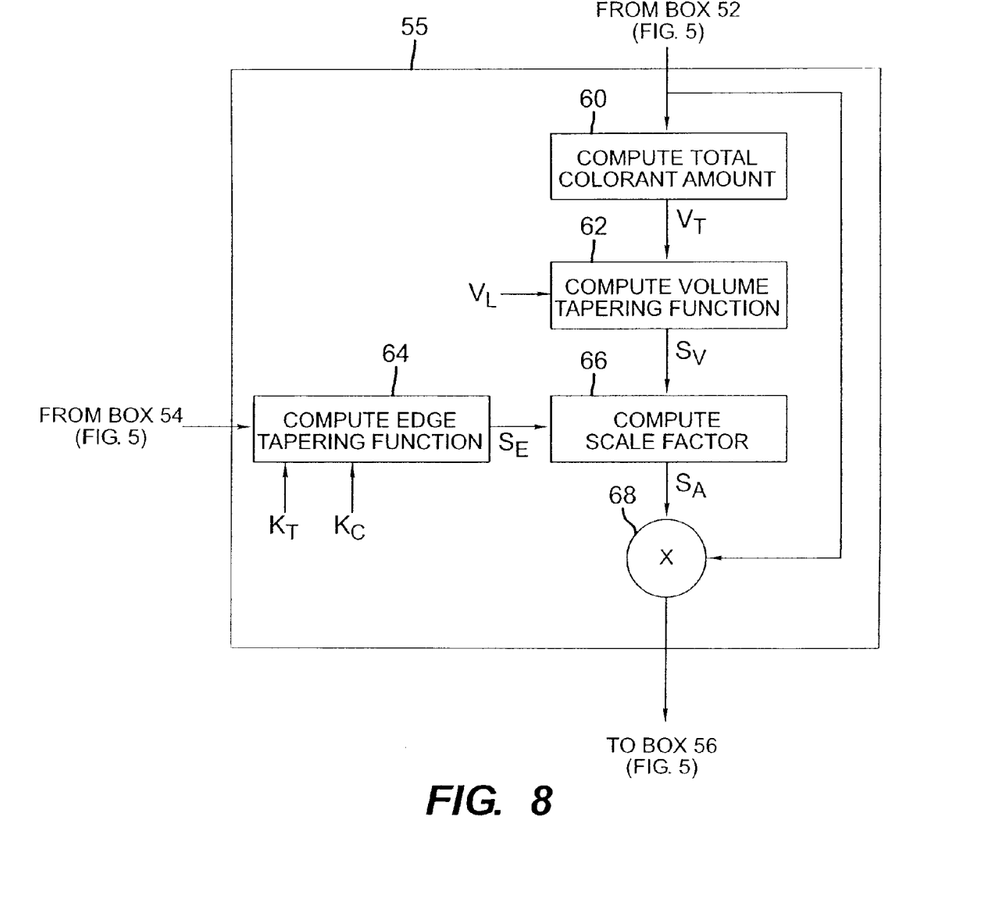
FIG. 8 is a flowchart illustrating an embodiment of the form modified additional color channels step.

Referring to FIG. 8, the details of one embodiment of the form modified additional color channels step 55 of FIG. 5 are shown. A total colorant amount, $V_T$, is computed for a given pixel of the image by summing the colorant amounts for the one or more additional color channels according to a compute total colorant amount step 60. A volume tapering function $S_V(V_T)$ is then computed using a compute volume tapering function step 62 according to $$S_V(V_T)=\text{Clip}(1-V_L/V_T,0,1)$$

where $V_L$ is the predetermined colorant amount limit described above, and Clip(A,min,max) is a function that clips the value of the argument A to the range between min and max. Thus, the volume tapering function $S_V(V_T)$ indicates how much colorant should be removed from a given pixel to satisfy the colorant amount limit, $V_L$. A plot of the volume tapering function $S_V(V_T)$ is shown in FIG. 6. Note from the plot of FIG. 6 that when $V_T<V_L$, the total colorant amount limit is already satisfied and the value of the volume tapering function $S_V(V_T)$ is 0, indicating that no colorant needs to be removed from the pixel. When $V_T>V_L$, the value of the volume tapering function $S_V(V_T)$ increases proportionally, indicating the fraction of the total colorant amount $V_T$ that is required to be removed to satisfy the colorant amount limit $V_L$.

Removing the amount of colorant specified by the volume tapering function $S_V(V_T)$ will result in the prevention of bleed artifacts for pixels immediately adjacent to a black edge, but pixels farther away from the edge are less susceptible to bleeding, and do not require as much colorant to be removed. Thus, an edge tapering function, $S_E(K_f)$, is employed to reduce the amount of colorant that is removed for pixels that are farther from the black edge, as described below.

Figure 7:
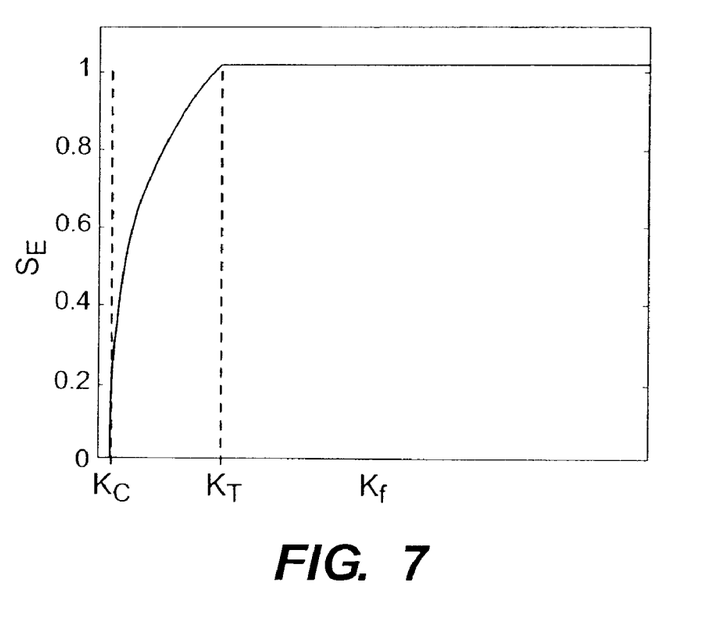
FIG. 7 is a plot of a typical edge tapering function.

Still referring to FIG. 8, the edge tapering function is computed using a compute edge tapering function step 64 according to $$S_E(K_f) = \left(\frac{K_f - K_c}{K_T - K_c}\right)^p$$

where $K_f$ is the filtered black image pixel value described above, p is an exponent that controls the shape of the edge tapering function, $K_T$ is a threshold parameter, and $K_c$ is a coring parameter. A plot of the edge tapering function, $S_E(K_f)$ is shown in FIG. 7. As can be seen from the plot, the threshold parameter $K_T$ sets the value of the filtered black image pixel at which it is required that the most ink be removed. Thus, the closer one gets to a black edge (or the magnitude of a black edge increases) the value of $K_f$ will increase, and it is desired to remove more ink. This is indicated by the generally increasing nature of the edge tapering function, $S_E(K_f)$. As can also be seen from the plot of FIG. 7, the coring parameter $K_c$ sets the point at which the edge tapering function $S_E(K_f)$ becomes non-zero. This parameter is used to prevent removing ink from the one or more additional color channels when the value of $K_f$ is very small. Small values of $K_f$ will indicate that the pixel is either far from a black edge, or the magnitude of the black edge is small. In these cases, it is not generally required to remove any ink to prevent bleed artifacts.

Still referring to FIG. 8, a compute scale factor step 66 is used to combine the behavior of the volume tapering function $S_V(V_T)$ and the edge tapering function $S_E(K_f)$ to produce the pixel-dependent scale factor for the additional color channels $S_A$, according to the equation below $$S_A=1-S_V(V_T)*S_E(K_f).$$

As described earlier, the additional color channels 52 are then multiplied by the pixel-dependent scale factor $S_A$ using a multiplier 68 to form the modified used to modify the black color channel using similar functions for the volume taper and edge taper functions described above.

In some applications, it can be advantageous to apply the method of the present invention to only certain regions of a document. For example, in a compound document containing text, graphics, and bitmap regions (i.e., digitized pictures), a time savings can be realized by applying the method of the present invention to only regions of the document containing text, graphics or both. An automatic detection algorithm can be used to segment the text, graphics, and bitmap portions of the document, and the detection signal used to control the processing such that the present invention is applied only to the text and graphics portions.

The embodiments of the present invention described above discuss computing scale factors or functions using a functional relationship having inputs including the corresponding image pixel values of the one or more additional input color channels and the image pixel value of the filtered black color channel. As will be understood by one skilled in the art, processing performance improvement can be achieved by precomputing such functional relationships and storing the result in one or more look-up table(s) (LUTs). The look-up tables can be addressed using the input values to determine the corresponding output values.

The invention has been described in detail with particular reference to certain preferred embodiments thereof, but it will be understood that variations and modifications can be effected within the spirit and scope of the invention.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

PARTS LIST 10 first region
11 second region
12 cross-section line
13 ink bleed artifacts
20 black input image cross-section
21 cyan input image cross-section
30 low-pass convolution filter
32 low-pass filtered black image cross-section
34 edge tapering function
36 scale factor cross-section
38 modified cyan image cross-section
40 hi-pass convolution filter
42 hi-pass filtered black image cross-section
44 edge tapering function
46 scale factor cross-section
48 modified cyan image cross-section
50 input digital image
51 black color channel 52 additional color channels
53 convolution operation
54 filtered black color channel
55 form modified additional color channels step
56 modified additional color channels
57 modified digital image
60 compute total colorant amount step
62 compute volume tapering function step
64 compute edge tapering function step
66 compute scale factor step
68 multiplier additional color channels 56. The modified additional color channels are then combined with the black color channel 51 to form the modified digital image 57 as shown in FIG. 5.

There are many variations of the present invention that can be applied by one skilled in the art. For example, experiments suggest that the severity of the bleed artifact correlates well with the total volume of ink present at the color/black ink boundary. Therefore, the total colorant amount $V_T$ can be calibrated using a calibration function such that it is linearly related to the total ink volume. This can be accomplished by a simple conversion between the pixel value of a given color channel to ink volume using some basic parameters of the printing system, such as the ink drop volume for each color ink, and the number of ink drops placed at each location. Such a conversion will be obvious to one skilled in the art.

In some applications certain ink colors can bleed more than others. For example, chemical differences between a cyan and magenta ink can result in the black ink bleeding less into the cyan than it does the magenta. The present invention can be applied using ink color specific parameters to provide for scaling the different ink colors using different scale factors. In the example just given, it would be required to scale back the magenta ink next to black more than the cyan ink next to black to result in acceptable levels of ink bleed for both inks. Applying the present invention to achieve this effect will be straightforward for one skilled in the art.

Additionally, it is possible to apply the method of the present invention to provide for modifying the black color channel in addition to the additional color channels. This can be accomplished by filtering the additional color channels using one of the filtering techniques described above. The filtered color channels can then be combined to form a second filtered color channel by summing the values of the filtered color channels. Another way to combine the filtered color channels would be to set the second filtered color channel value to the largest of the individual filtered color channel values. Then, in a similar fashion to the method described above, the second filtered color channel can be

The invention claimed is:

1. A method for forming a modified digital image by modifying an input digital image having a black input color channel corresponding to a black colorant and one or more additional input color channels corresponding to additional colorants, each color channel having an (x,y) array of image pixel values, to form a modified digital image having one or more modified color channels, said modified digital image being suitable for producing a printed image having reduced ink bleed artifacts on an ink jet printer using the black and additional colorants, comprising:
   a) forming a filtered black color channel from the black input color channel using a convolution operation; and
   b) forming the modified digital image by modifying image pixel values in one or more of the additional input color channels in response to the corresponding image pixel values of the filtered black color channel,
so that when the modified digital image is used to produce a printed image on an ink jet printer there are reduced ink bleed artifacts.

2. The method according to claim 1 wherein the additional colorants include a cyan, magenta, or yellow colorant.

3. The method according to claim 1 wherein the convolution operation in step a) includes convolving the black input color channel with a low-pass convolution filter.

4. The method according to claim 3 wherein the low-pass convolution filter is a box filter.

5. The method according to claim 1 wherein the convolution operation in step a) includes convolving the black input color channel with a hi-pass convolution filter.

6. The method according to claim 5 wherein the convolution operation further includes an absolute value operation that is applied to the convolved black color channel.

7. The method according to claim 1 wherein the colorant amount for one or more of the additional colorants is reduced in regions where the filtered black color channel is large, thereby producing reduced ink bleed artifacts.

8. The method according to claim 1 wherein step b) includes:
   i) determining pixel-dependent scale factor(s) for the one or more additional input color channels in response to the corresponding image pixel value of the filtered black color channel; and
   ii) scaling the image pixel values for the one or more additional input color channels using the pixel-dependent scale factor(s) to determine modified image pixel values.

9. The method according to claim 8 wherein the pixel-dependent scale factors, $S_A$, are determined using the equation:

$$S_A = 1 - S_V(V_T) * S_E(K_f)$$

where $V_T$ is a total colorant amount determined by summing the colorant amounts for the one or more additional input color channels, $K_f$ is the image pixel value of the filtered black color channel, $S_V(\ )$ is a volume tapering function, and $S_E(\ )$ is an edge tapering function.

10. The method according to claim 9 wherein the volume tapering function is given by $$S_V(V_T) = Clip(1 - V_L/V_T, 0, 1)$$

where $V_L$ is a specified colorant amount limit parameter, and Clip(A,min,max) is a function that clips the value of A to the range between min and max.

11. The method according to claim 8 wherein the pixel-dependent scale factor(s) are determined by addressing one or more look-up table(s) with the image pixel value of the filtered black color channel.

12. The method according to claim 1 wherein the one or more modified color channels are determined by using a functional relationship having inputs including the corresponding image pixel values of the one or more additional input color channels and the image pixel value of the filtered black color channel.

13. The method according to claim 1 wherein a calibration function is applied to the input color channels such that the input pixel values are substantially linear with colorant amount.

14. The method according to claim 1 further including:
   c) forming a second filtered color channel from one or more of the additional input color channels using a convolution operation; and
   d) forming a modified black color channel for the modified digital image by modifying image pixel values in the black input color channel in response to the corresponding image pixel values of the second filtered color channel.

15. The method according to claim 14 wherein the convolution operation in step c) includes convolving at least one of the additional input color channels with a low-pass convolution filter.

16. The method according to claim 15 wherein the low pass convolution is a box filter.

17. The method according to claim 14 wherein the convolution operation in step c) includes convolving at least one of the additional input color channels with a hi-pass convolution filter.

18. The method according to claim 14 wherein step c) includes filtering two or more of the additional input color channels using a convolution operation to form filtered additional color channels and combining the filtered additional color channels to form the second filtered color channel.

19. The method according to claim 18 wherein the filtered additional color channels are combined by summing the filtered additional color channels.

20. The method according to claim 18 wherein the filtered additional color channels are combined by determining the largest filtered additional color channel.

21. The method according to claim 14 wherein step c) includes combining two or more of the additional color channels to form a combined color channel and filtering the combined color channel to form the second filtered color channel.

22. The method according to claim 1 wherein only regions if the input digital image containing text, graphics, or both are modified.

23. The method according to claim 22 wherein an automatic detection algorithm is used to detect text and graphics regions of the input digital image.

24. A computer storage product having at least one computer storage medium having instructions stored therein causing one or more computers to perform the method according to claim 1.

* * * * *